Feb. 21, 1939.  W. L. LENTZ ET AL  2,148,078
STREAMLINE LOCOMOTIVE AND TENDER
Filed Sept. 26, 1935   15 Sheets-Sheet 1
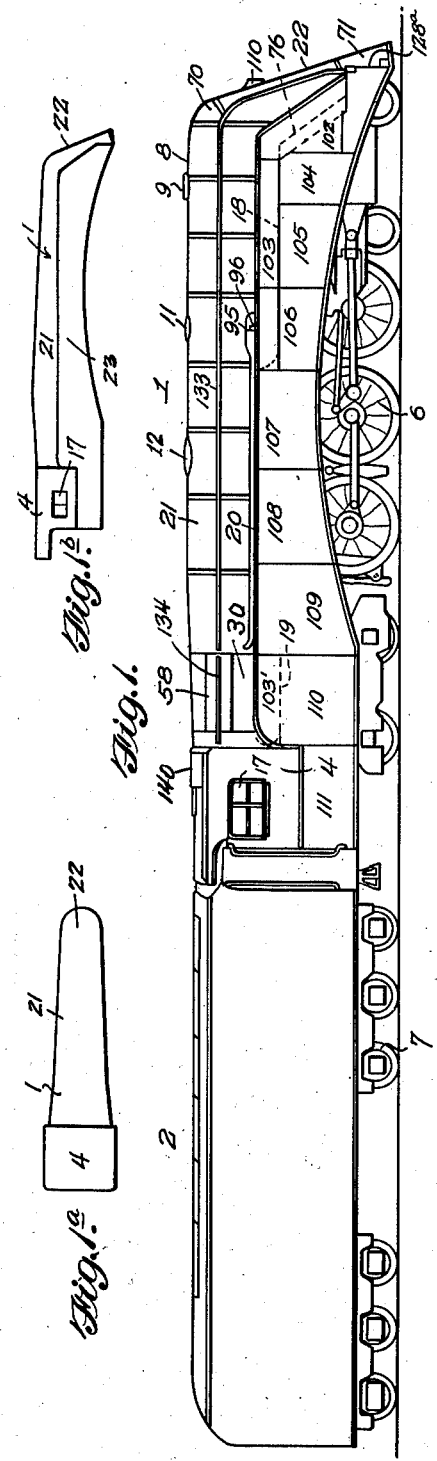
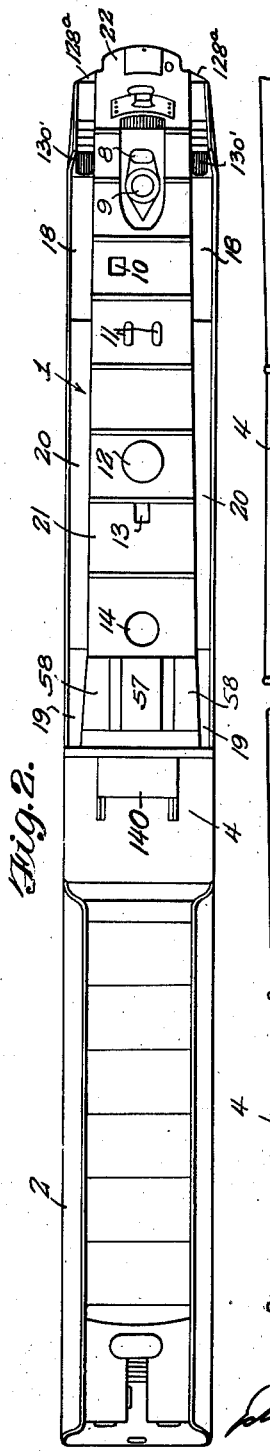
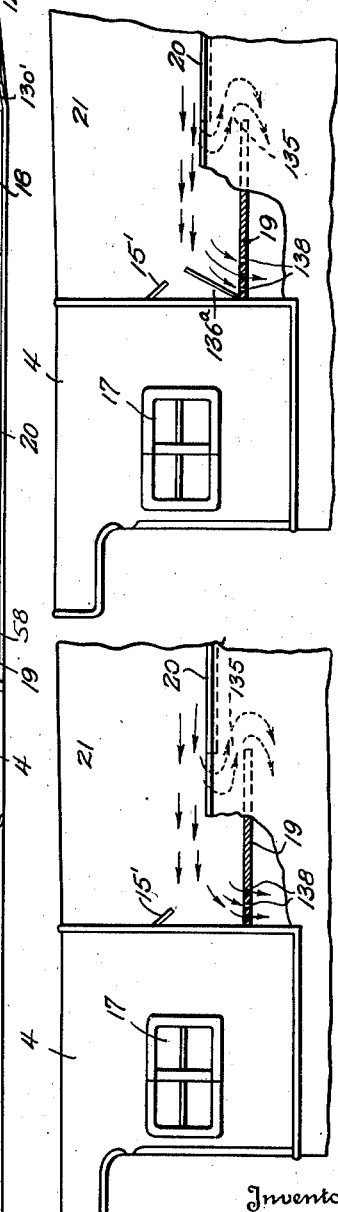

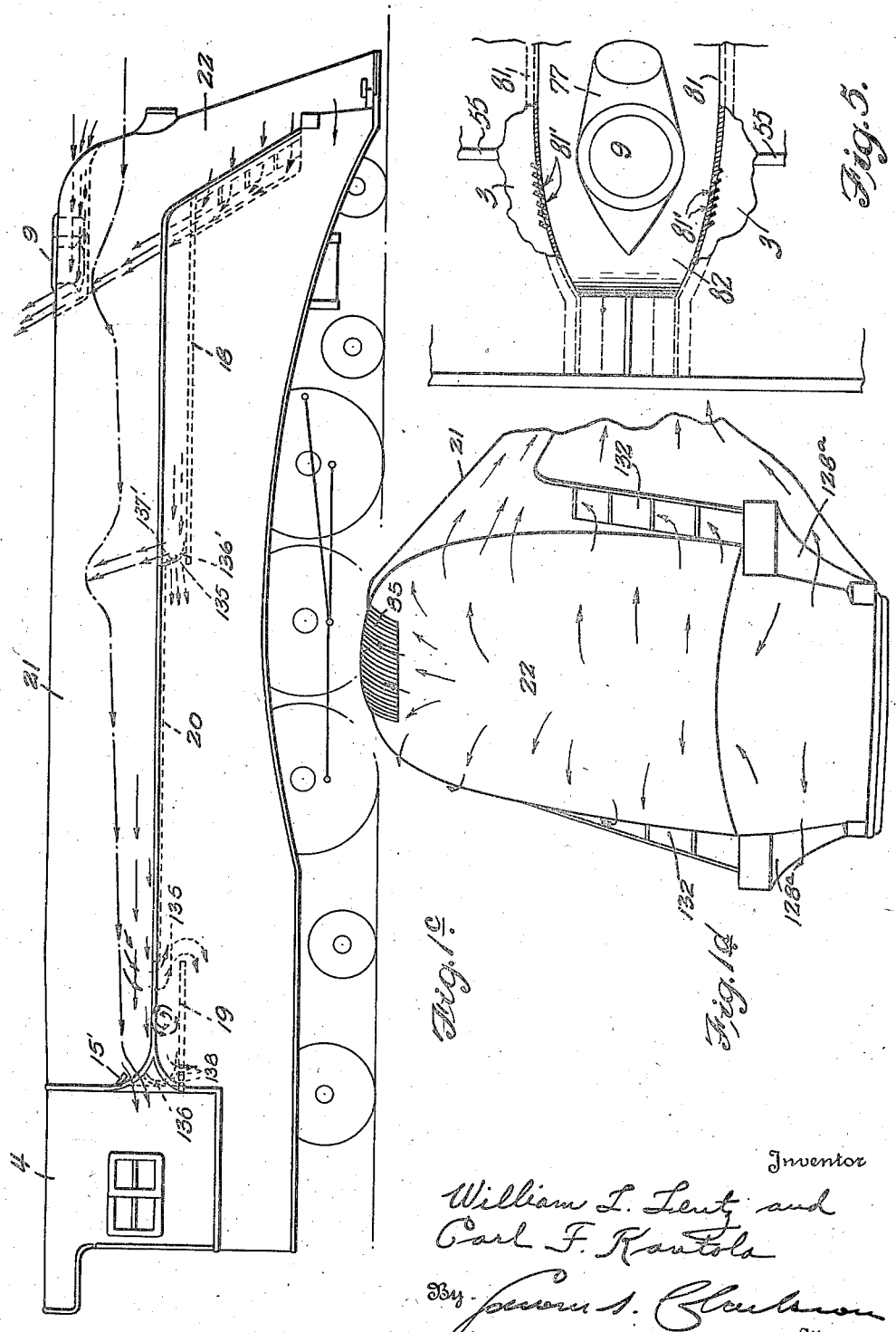

Feb. 21, 1939.   W. L. LENTZ ET AL   2,148,078
STREAMLINE LOCOMOTIVE AND TENDER
Filed Sept. 26, 1935   15 Sheets-Sheet 3
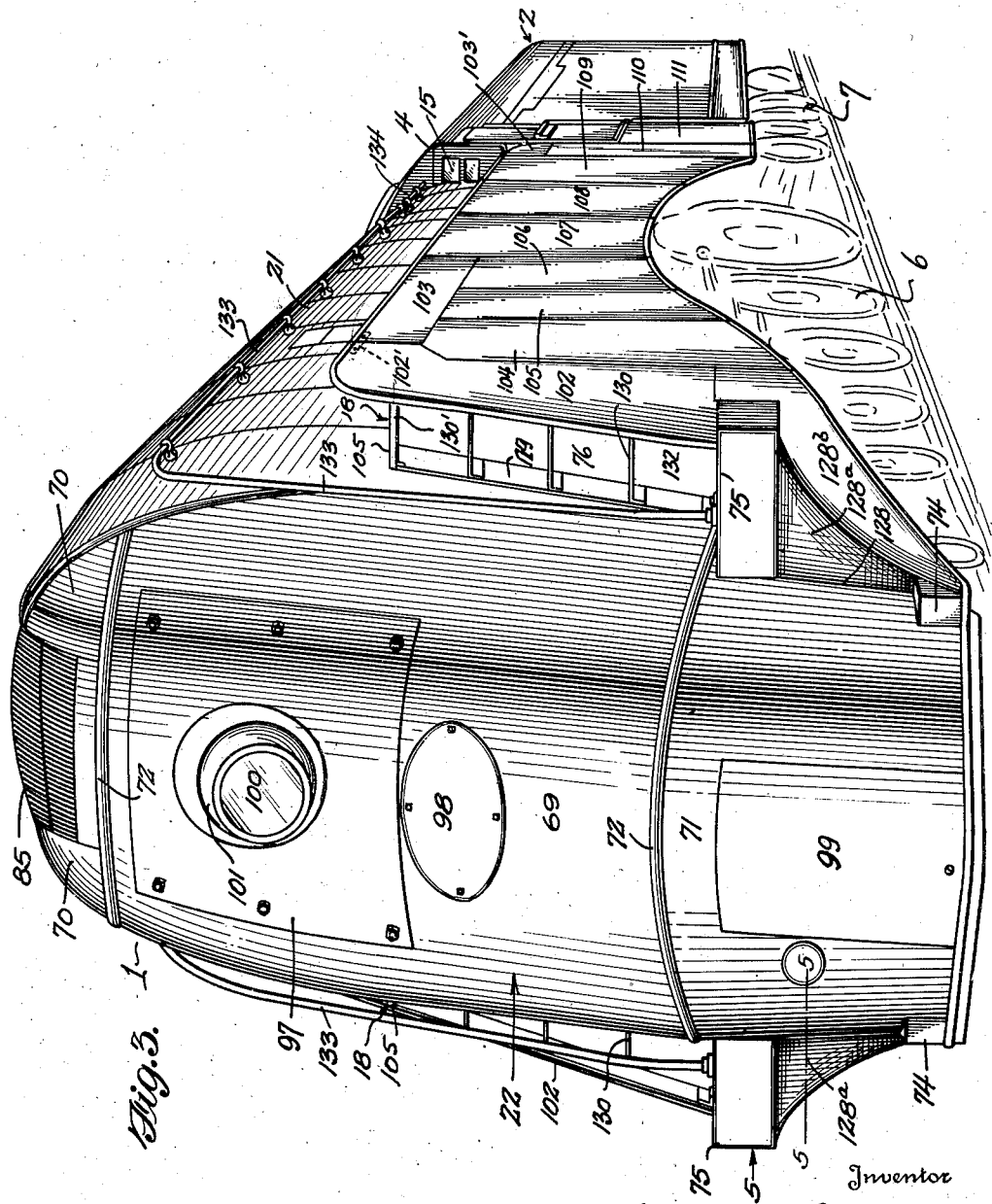

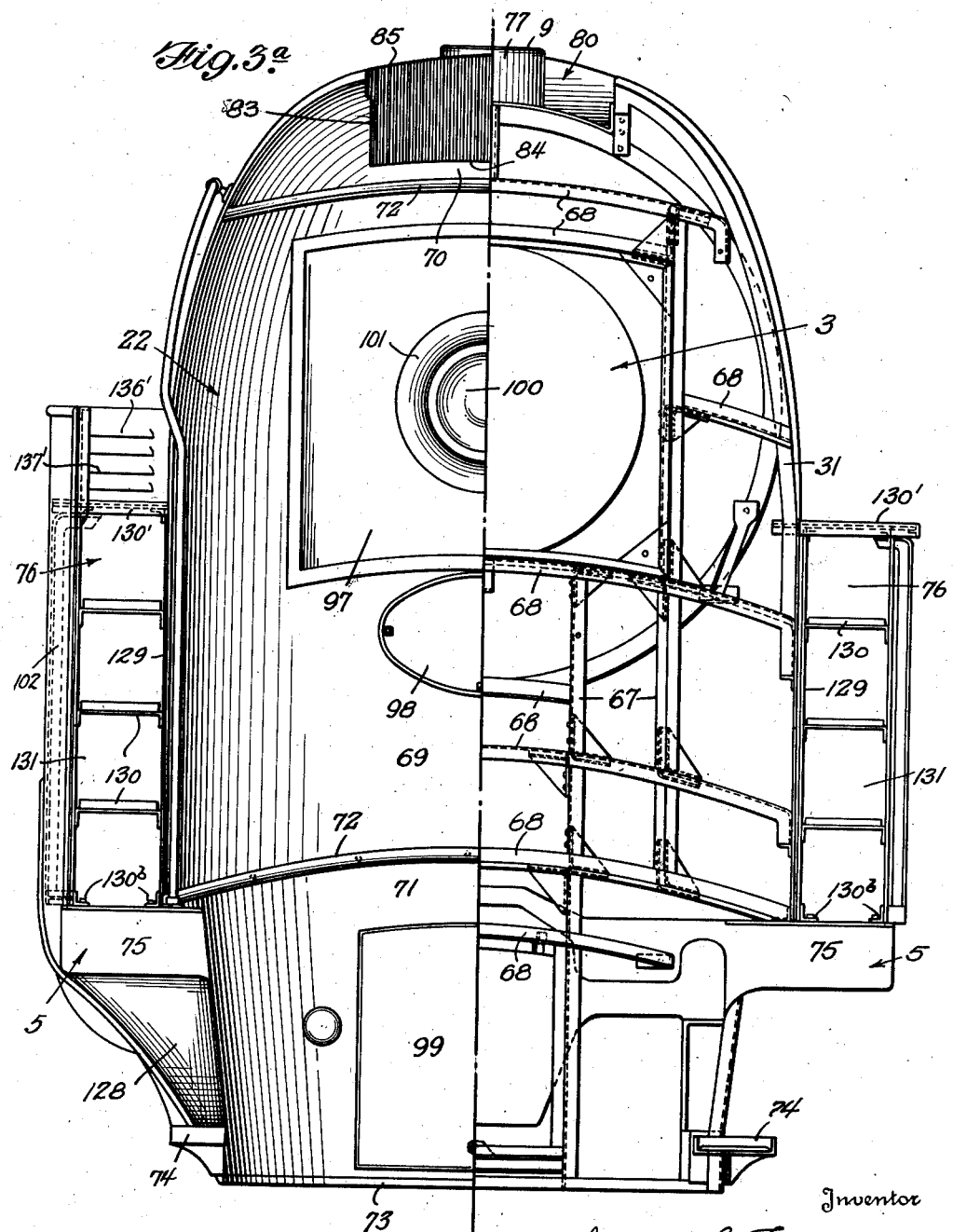

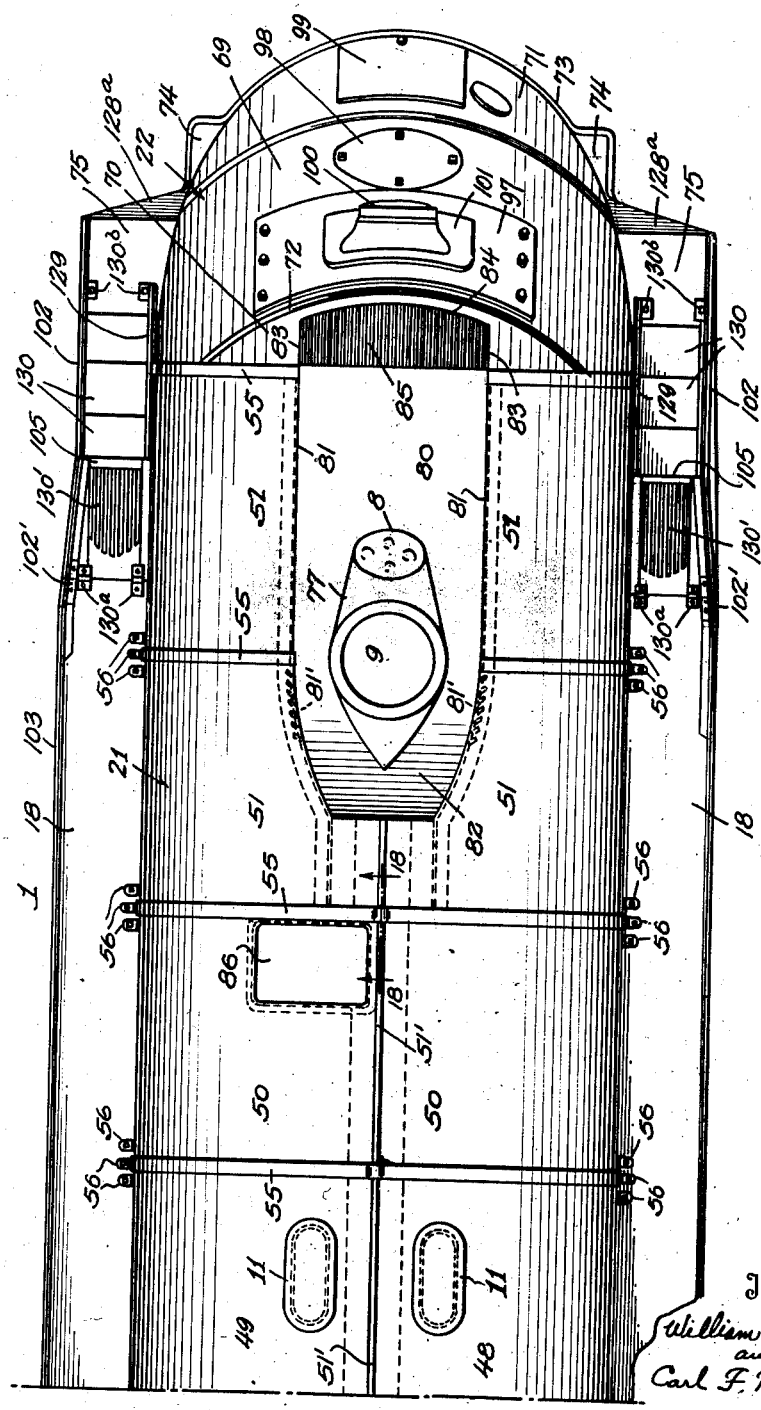

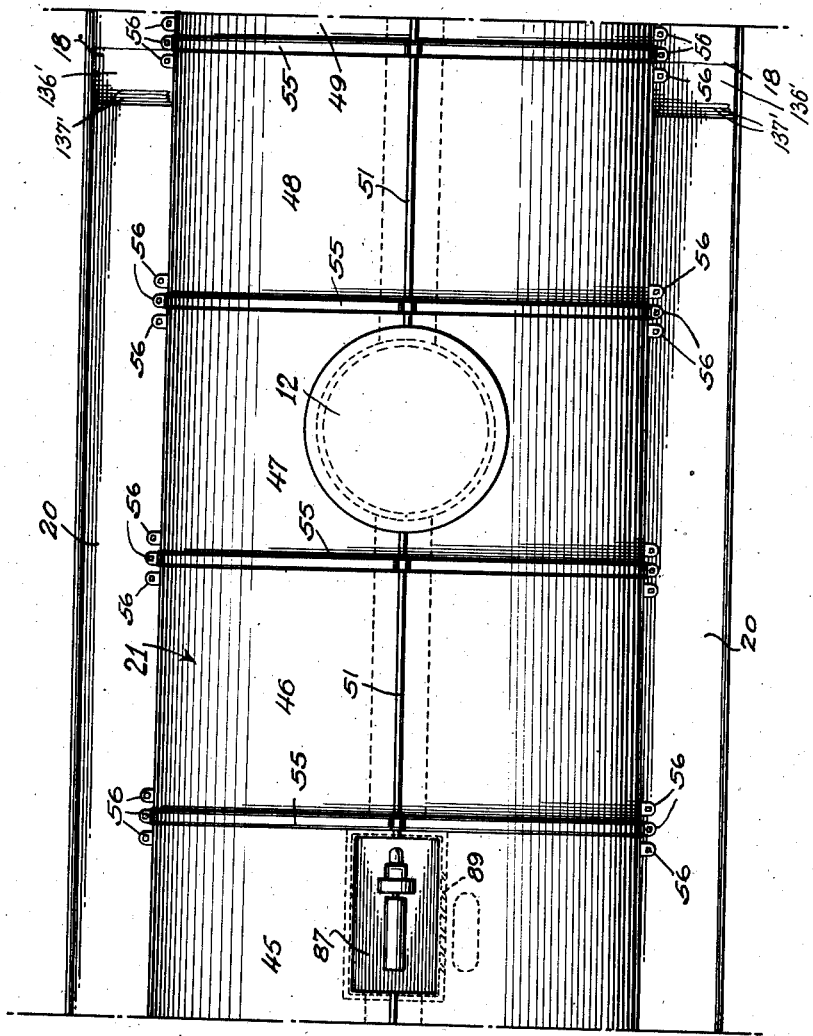

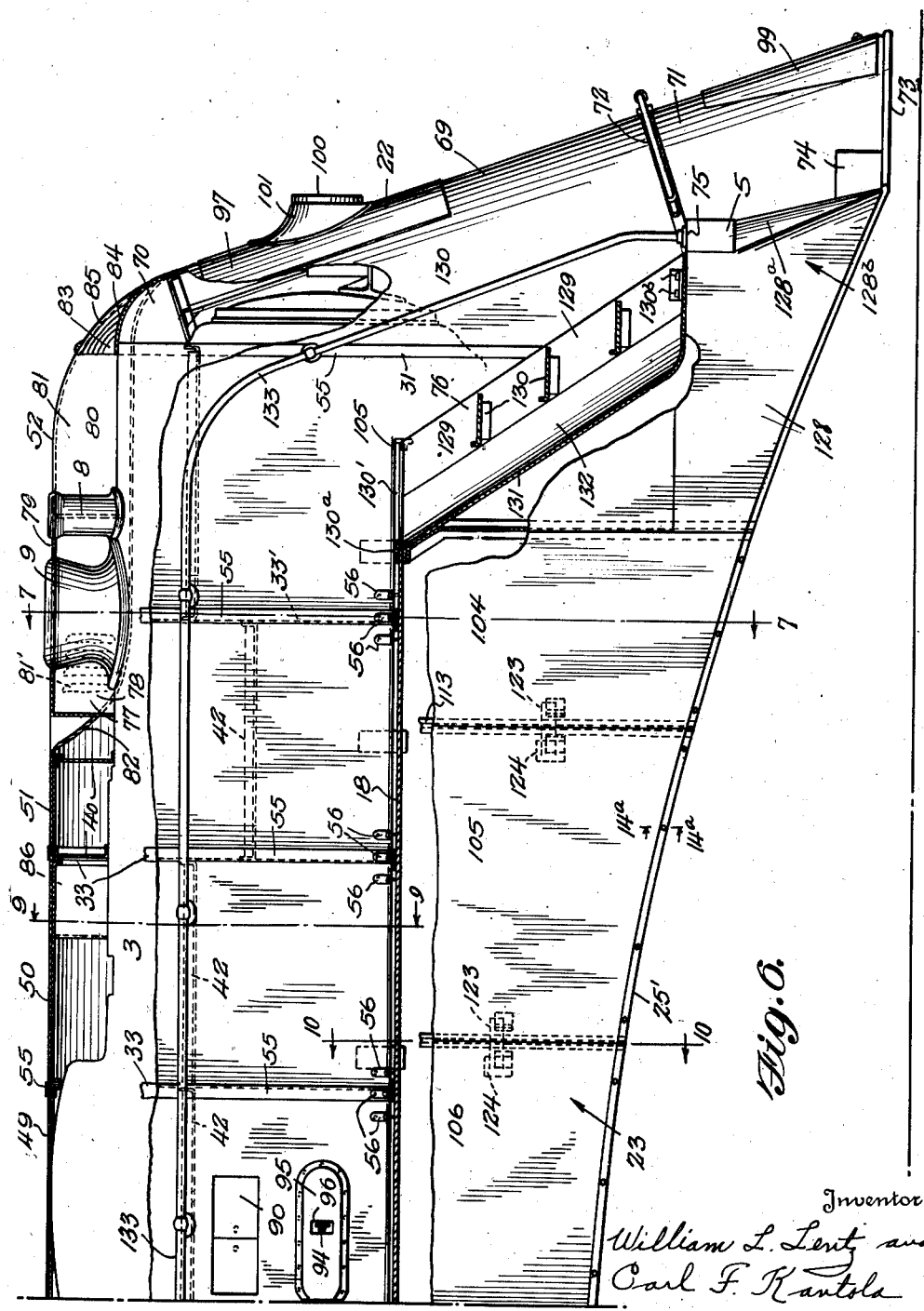

Feb. 21, 1939.   W. L. LENTZ ET AL   2,148,078
STREAMLINE LOCOMOTIVE AND TENDER
Filed Sept. 26, 1935   15 Sheets-Sheet 8
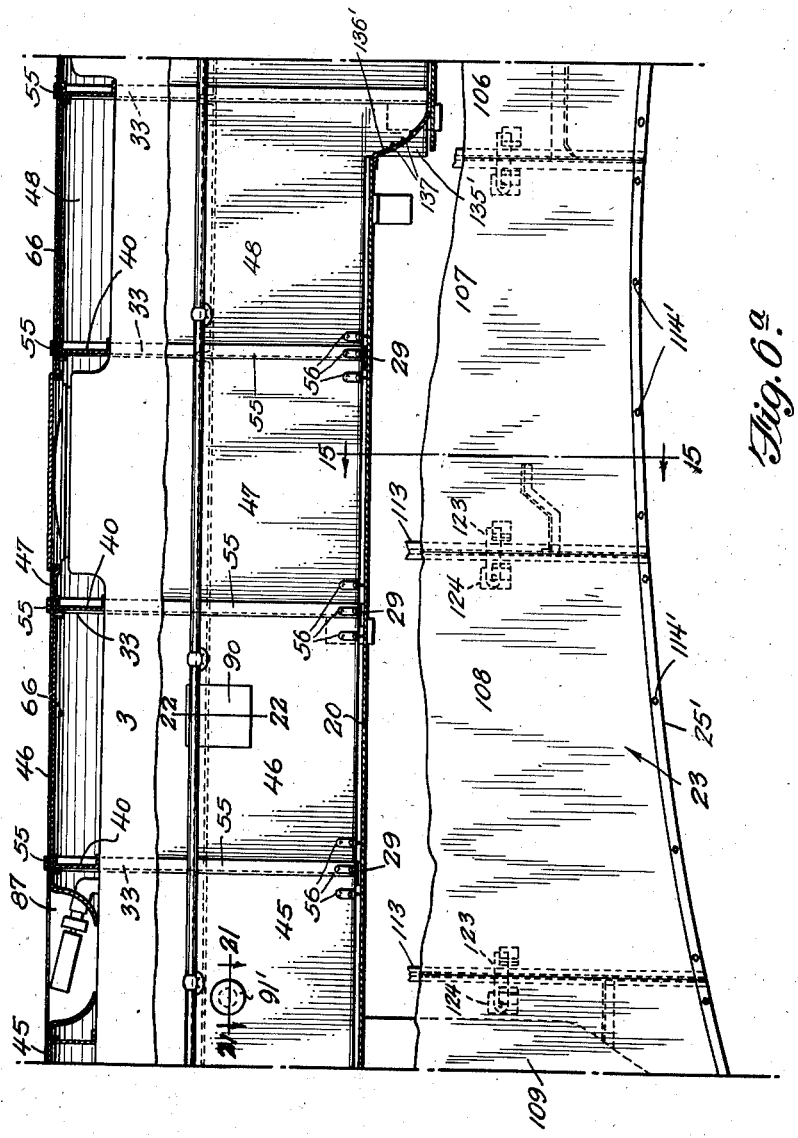

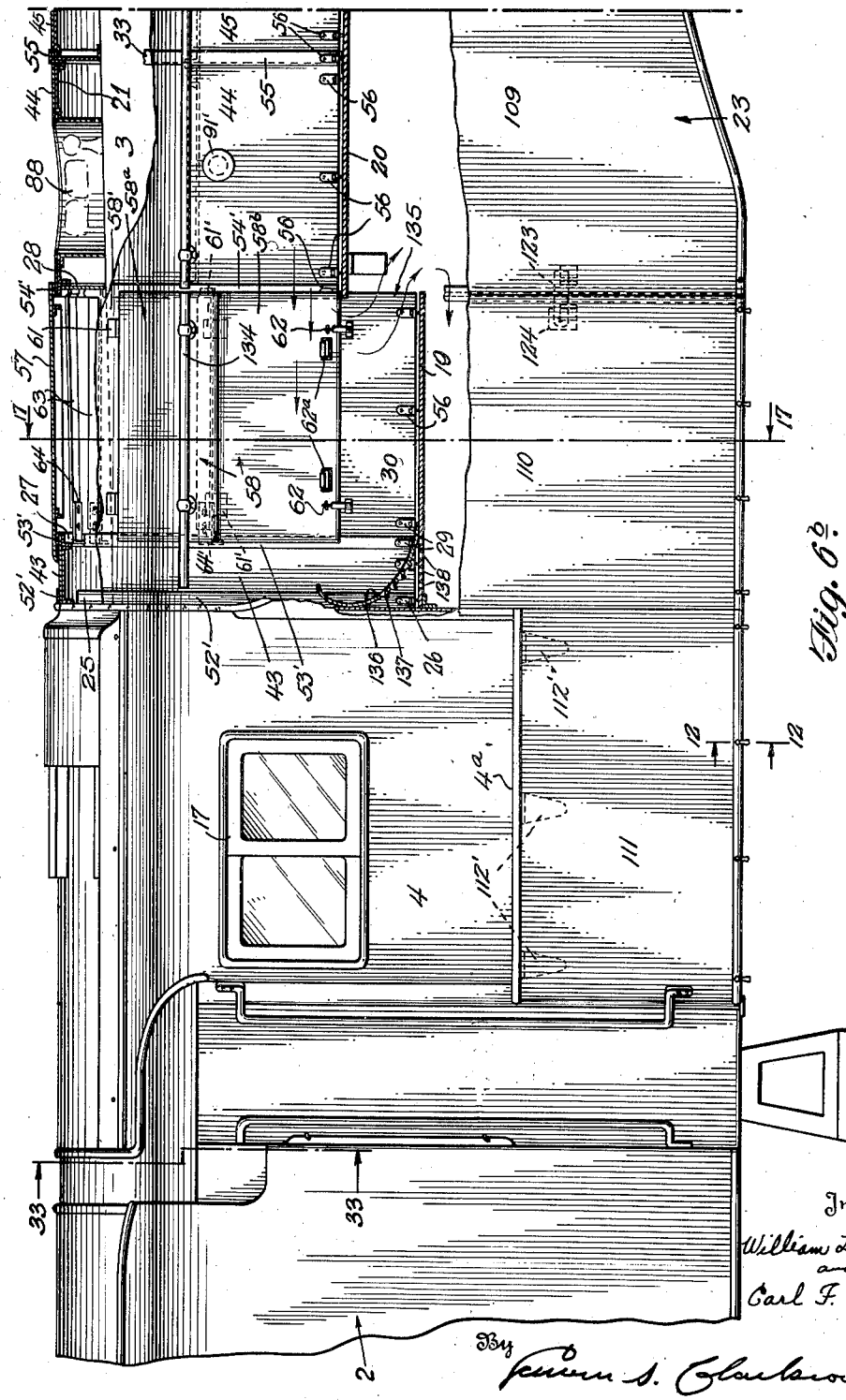

Feb. 21, 1939.  W. L. LENTZ ET AL  2,148,078
STREAMLINE LOCOMOTIVE AND TENDER
Filed Sept. 26, 1935   15 Sheets-Sheet 10
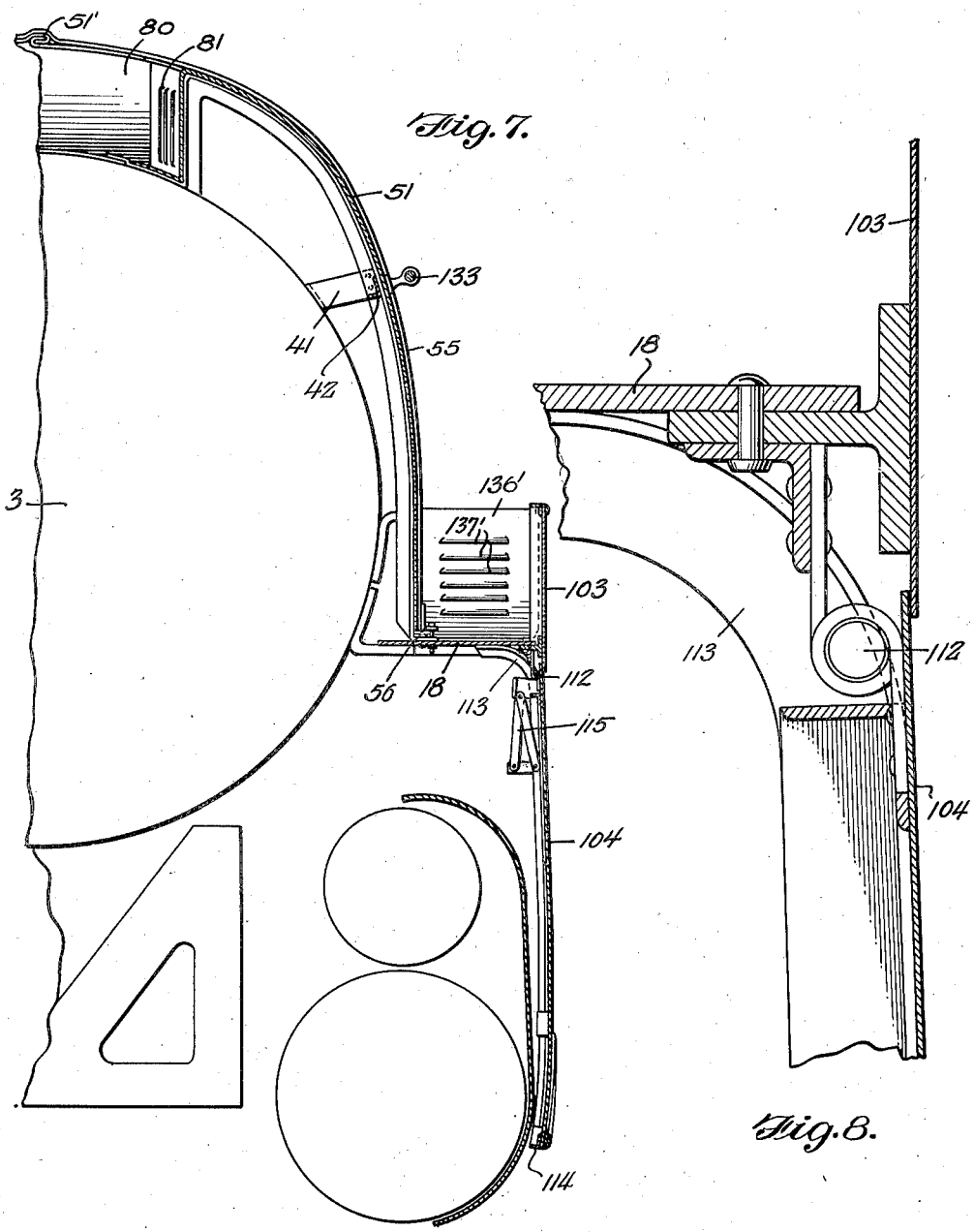

Feb. 21, 1939.  W. L. LENTZ ET AL  2,148,078
STREAMLINE LOCOMOTIVE AND TENDER
Filed Sept. 26, 1935  15 Sheets-Sheet 11
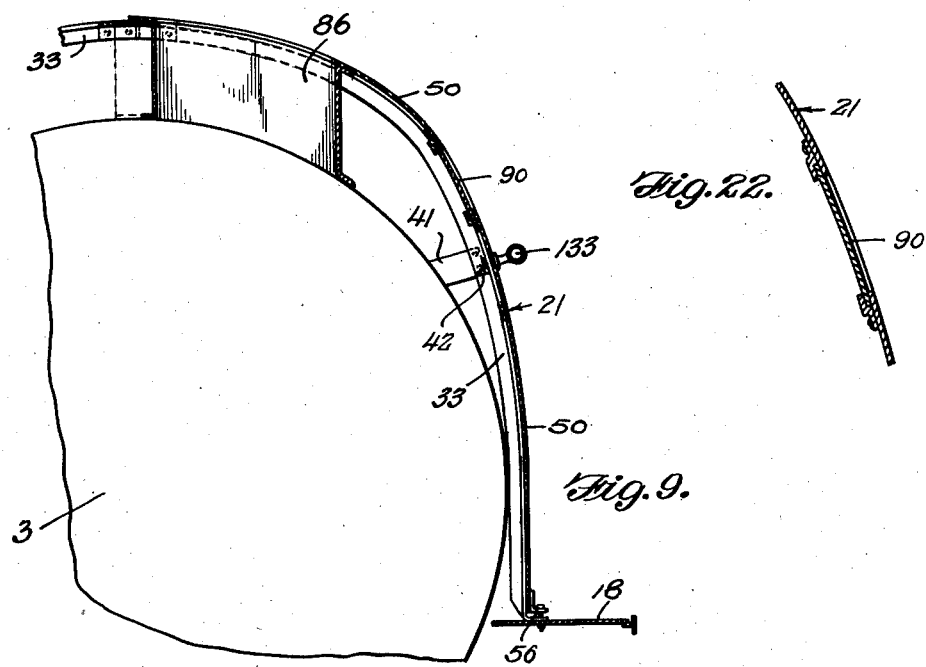
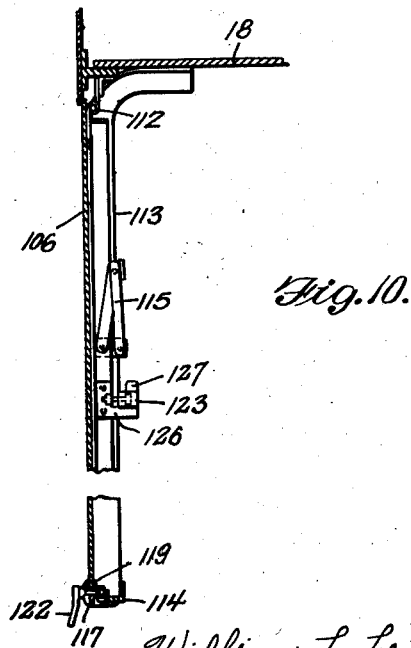
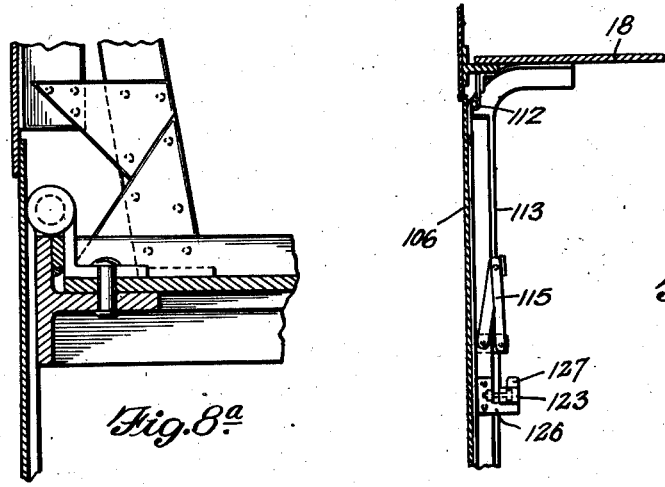
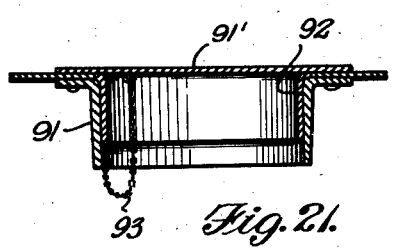

Feb. 21, 1939. W. L. LENTZ ET AL 2,148,078
STREAMLINE LOCOMOTIVE AND TENDER
Filed Sept. 26, 1935 15 Sheets-Sheet 12
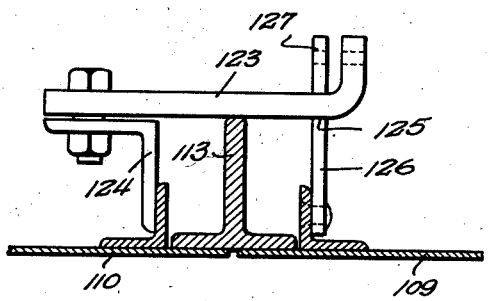
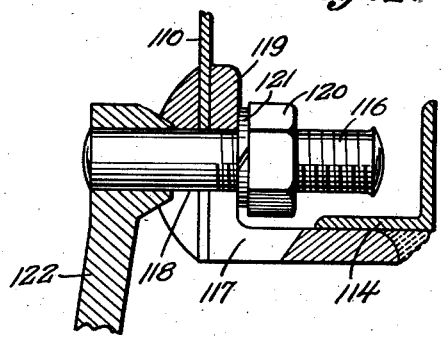
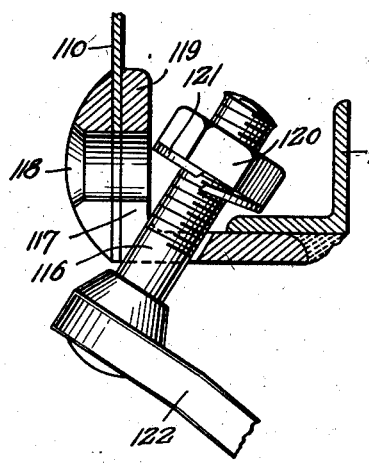
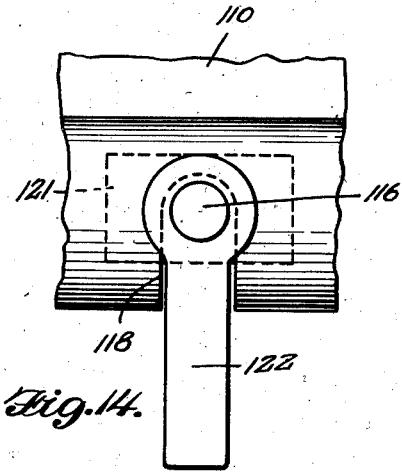
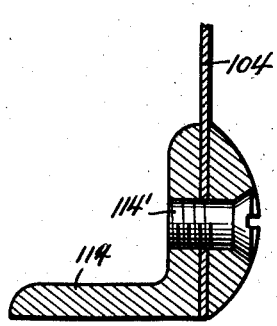
Inventor
William L. Lentz and
Carl F. Kantola
By
Attorney

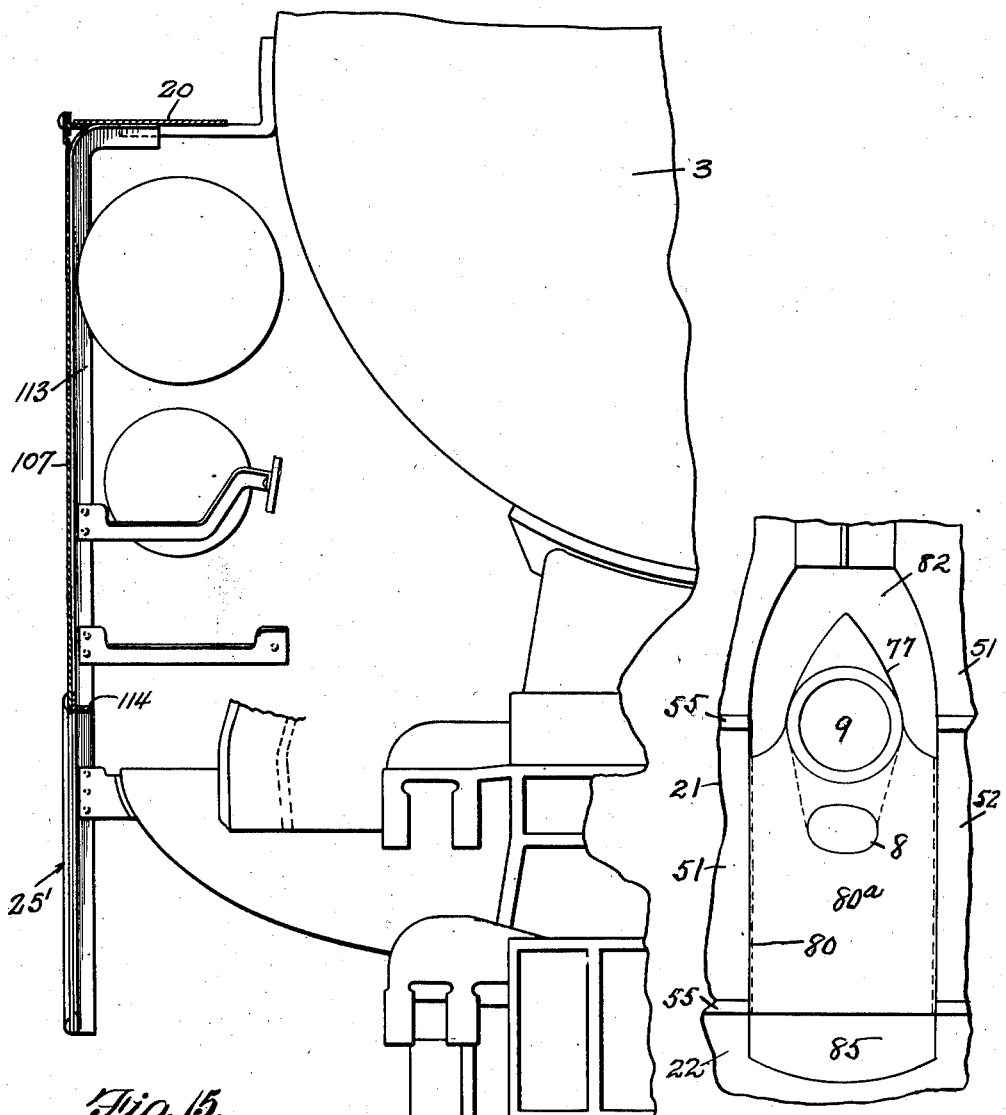

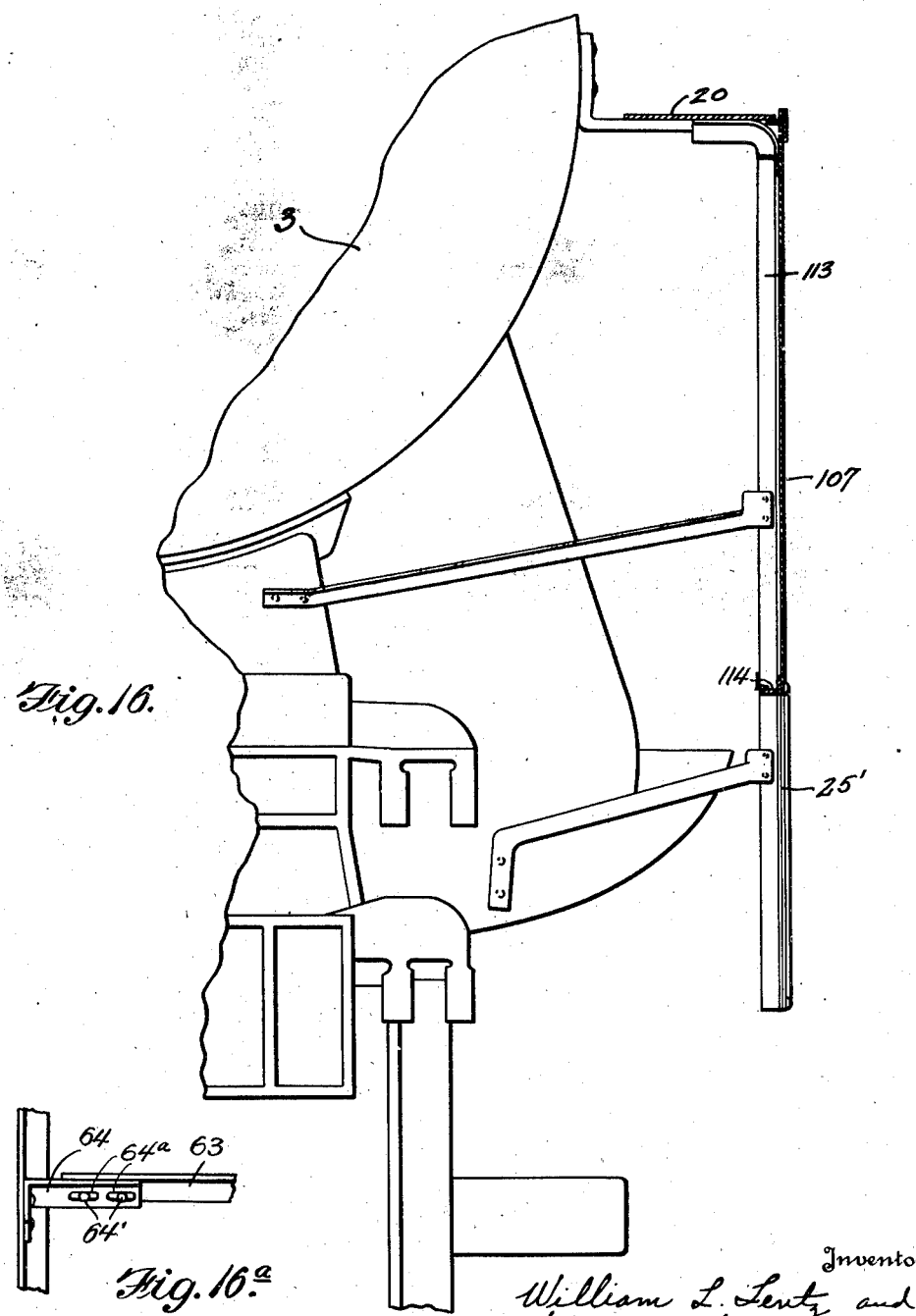

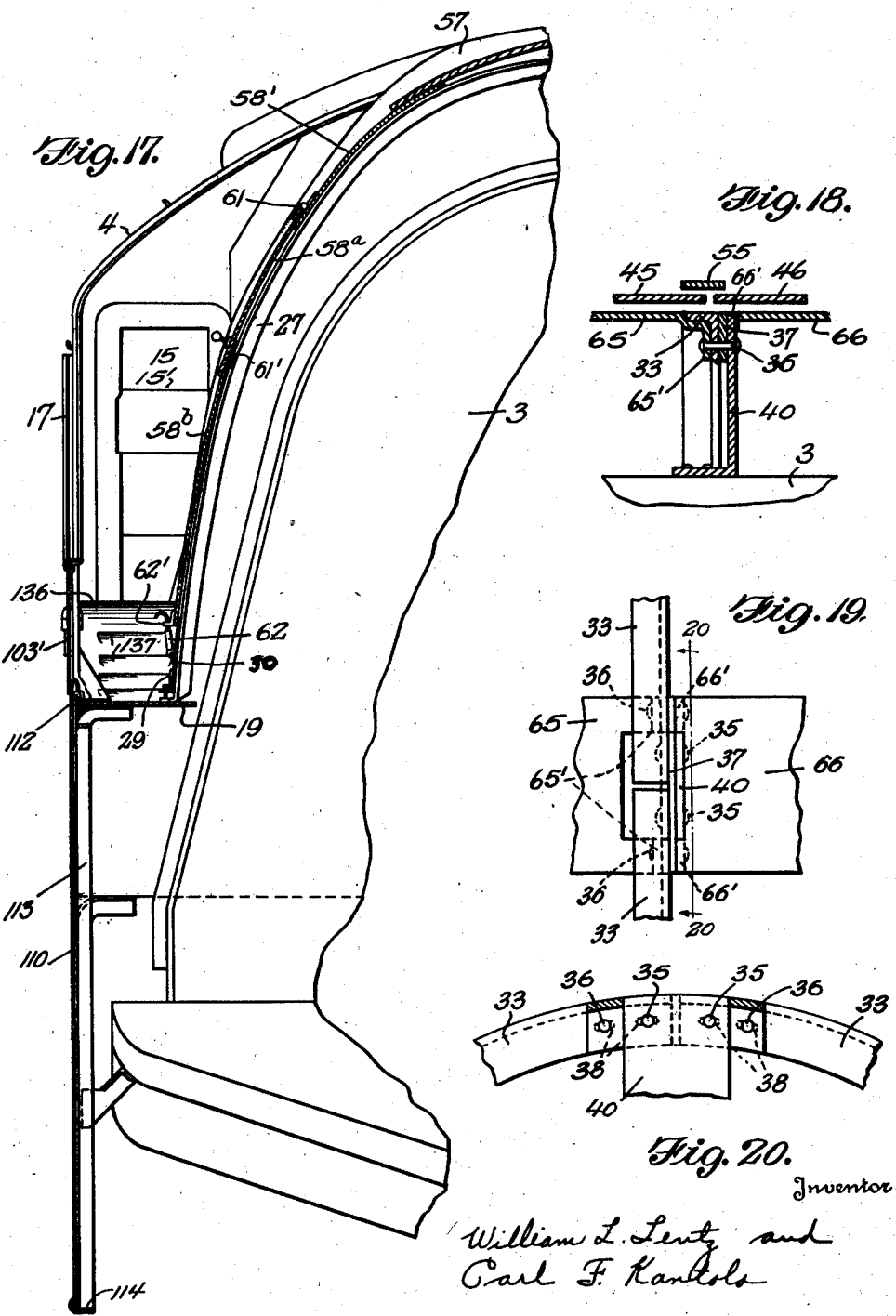

Patented Feb. 21, 1939

2,148,078

UNITED STATES PATENT OFFICE 2,148,078

STREAMLINE LOCOMOTIVE AND TENDER

William L. Lentz, Tuckahoe, N. Y., and Carl F. Kantola, Ashtabula, Ohio, assignors to The New York Central Railroad Company, a corporation of New York Application September 26, 1935, Serial No. 42,342

25 Claims. (Cl. 105—2)

This invention relates to railway locomotives and tenders, and particularly to a novel and improved construction of the outside shells or jackets of locomotives and tenders designed generally to reduce head and angled wind air resistance, to improve the appearance of the locomotive, to materially reduce or prevent smoke nuisances and hazards and augment the draft in the case of steam locomotives, to protect working parts from physical injury, to maintain cylinder temperatures and running temperatures of other locomotive parts and appurtenances in order to prevent freezing or other undesirable actions under different weather conditions, to enable certain service operations on the locomotive to be carried out in the use of a streamline structure in a more convenient and efficient manner, and to secure other desirable and important advantages in the construction and operation of steam and other types of locomotives.

One object of the invention is to provide an improved streamline structure for steam and other locomotives and tenders whereby head, angle and drag resistances to travel of the locomotive may be reduced to a material extent.

Another object of the invention is to provide a streamline construction for locomotives whereby working parts and appurtenances requiring frequent inspection, repairs and servicing are covered to eliminate parasitic resistance while at the same time permitting ready and convenient access thereto.

Still another object of the invention is to provide a streamline shell construction for steam locomotive boilers which allows free expansion and contraction of the streamline shell with the boiler while preventing distortion or fracture of parts of the boiler or its streamline shell.

Still another object of the invention is to provide a streamline structure for steam locomotives having special means for lifting the smoke and gases issuing from the smoke stack directly upward to a level above that of the locomotive cab and causing the smoke and gases to travel rearwardly above such level, and for deflecting downward in the region of the clear vision windows in the cab any air currents carrying foreign matter of any kind liable to strike or cloud the windows or otherwise impair the vision of the engineer, thereby eliminating the usual well known smoke nuisances and hazards, while at the same time increasing the efficiency of the exhaust.

Still another object of the invention is to provide a streamline shell for locomotives embodying means which ensures greater safety to driver or fireman in traveling along the running boards when necessary and when the locomotive is running at high speed.

With these and other objects in view, which will appear in the course of the subjoined description, the invention consists in the novel features of construction, combination and arrangement of parts hereinafter fully described and claimed, reference being had to the accompanying drawings, showing the application of the invention, for purposes of exemplification, to a steam locomotive, in which:—

Fig. 1 is a side elevation of a streamlined locomotive and tender embodying the invention.

Figs. 1a and 1b, respectively, are diagrammatic side and plan views of the locomotive on a reduced scale and showing in an exaggerated manner the general conformation thereof.

Figs. 1c and 1d are, respectively, a diagrammatic side elevation and a front end perspective diagram of the locomotive, showing by indicating arrows the direct and resultant directions of the air streams.

Fig. 2 is a top plan view of the locomotive and tender.

Figs. 2a and 2b are diagrammatic elevations showing certain modifications of features associated with the cab and rear runningboard and indicating by arrows courses of air flow.

Fig. 3 is a front perspective view of the locomotive.

Fig. 3a is a view in front elevation of the locomotive with the shell parts at one side of the longitudinal center line omitted to disclose frame parts.

Figs. 4, 4a and 4b conjointly show a plan view of the locomotive and tender on an enlarged scale.

Fig. 5 is a detail section taken substantially on line 5—5 of Fig. 3.

Figs. 6, 6a and 6b collectively show a side elevation, with parts broken away and in section, of the locomotive and a part of the tender on an enlarged scale.

Fig. 7 is a vertical transverse section through one side of the locomotive taken on line 7—7 of Fig. 6.

Fig. 8 is a detail sectional view on an enlarged scale showing the hinge mounting of one of the panel doors.

Fig. 8a is a similar view showing the hinge mounting of another panel door.

Fig. 9 is a vertical transverse section similar to Fig. 7 taken on line 9—9 of Fig. 6.

Fig. 10 is a vertical transverse section taken on the line 10—10 of Fig. 6.

Fig. 11 is a horizontal section showing the construction of one of the upper latches of certain panel doors.

Figs. 12, 13 and 14 are views showing the construction of one of the fasteners of other panel doors.

Fig. 14a is a detail section on line 14a—14a of Fig. 6, showing one of the bottom fasteners for the doors provided with the upper latches.

Fig. 15 is a vertical transverse section on line 15—15 of Fig. 6a through one side of the locomotive.

Fig. 16 is a similar view through the opposite side of the locomotive.

Fig. 16a is a detail section showing bracing elements of the turret part of the cowl frame structure.

Fig. 17 is a section through one side of the locomotive taken substantially on line 17—17 of Fig. 6b.

Fig. 18 is an enlarged detail section on line 18—18 of Fig. 5.

Fig. 19 is a plan view showing the construction of the joint between sections of the arched frame members.

Fig. 20 is a section on line 20—20 of Fig. 19.

Fig. 21 is a detail section on line 21—21 of Fig. 6a.

Fig. 22 is a detail section on line 22—22 of Fig. 6a.

Fig. 22a is a plan view showing a modification in the construction of the top air scoop.

While the streamline structures of the locomotive and tender are shown herein as formed as a whole or in part by external jacketing or fairing elements applied to the body shell and parts of a standard or special type of non-streamlined steam locomotive and tender to impart a streamline formation thereto, it is to be understood that the streamline shell structures may be formed in whole or in part by the body shells themselves of the locomotive and tender, and that the principle of the invention is not limited to steam locomotives and tenders, but may be applied to electric, Diesel and other types of locomotives.

Referring now more particularly to the drawings, 1 designates generally the locomotive, 2 the locomotive tender, 3 the locomotive boiler shell, 4 the locomotive cab, 5 the locomotive pilot beam, 6 the running gear of the locomotive, and 7 the running gear of the tender, all of which may be of standard or any desired special construction. Between the points A—A, B—B and C—C, respectively, extend the firebox, barrel and smokebox portions of the locomotive boiler, which is represented as having certain standard equipment parts, to wit, an auxiliary exhaust steam stack 8, smoke stack 9, bell 10, sand box 11, steam dome 12, whistle 13 and safety valve 14, in addition to other standard equipment parts hereinafter referred to. The cab 4 is provided with the usual front doors or windows 15, having clear vision window sections 15', and with rear and side windows 16 and 17. At each side of the locomotive is a running board comprising front, rear and intermediate sections 18, 19 and 20, of suitable relative lengths, the front and rear sections 18 and 19 being arranged in a horizontal plane below the horizontal plane of the intermediate section and preferably but not necessarily in horizontal alinement with each other.

The locomotive is provided, in accordance with my invention, with a streamline covering comprising a cowl portion 21, a hood portion 22, and side panels or skirts generally designated 23. The cowl portion 21 consists of a continuous shell of jacket iron or steel covering the boiler above the running boards between the front of the cab and the forward end of the firebox, said jacket, as shown in Figs. 1a and 1b, having its greatest width and diameter at the forward end of the firebox, and tapering from this point forward to the front end of the smokebox and rearward to the cab. The hood portion 22 extends from the forward end of the cowl to the tip end of the locomotive pilot and over the pilot portion transversely from side to side thereof between the forward edges of the sides of the cowl and to a point below the level of the pilot beam 5. The side panels 23 form skirts which extend the full distance between the lower portion of the hood and the locomotive cab from points above the level of the running board downwardly to a sufficient level to cover the running gear, ash pan and other appurtenances to a substantial degree to deflect the air currents therefrom and to cooperate with the cowl and hood to give a general streamline conformation to the entire locomotive. The cowl comprises an arched frame member 25 secured to the front wall of the cab and having foot portions secured by jacket band lugs 26 to the rear sections of the running board, arched frame members 27 and 28 arranged in front and rear of the steam turret portion of the boiler and having foot portions secured respectively by jacket band lugs 29 to the rear and intermediate running boards, filling sheets 30 disposed between the lower portions of the frame members 27 and 28 below the horizontal plane of the running board sections 20, an arched frame member 31 arranged at the juncture of the cowl and hood and having foot portions (not shown) secured to the boiler structure, and a series of suitably spaced arched frame members 33 and 33' arranged at intervals along the length of the boiler between the frame members 28 and 31 and having foot portions 32 secured by jacket band lugs to the intermediate sections of the running boards, as hereinafter described. These frame members are of rolled angle iron or steel. The frame member 25 may be of unitary or one-piece construction, but the other frame members 27, 28, 31, 31' and 33 are of two-part construction, each consisting of similar half sections having their foot portions fastened in position as previously described and having their upper end portions arranged in opposed relation. The opposed upper end portions of each arched frame member 27, 28 and 33, as shown particularly in Figs. 18, 19 and 20, are secured by bolts 35 and 36 to a splice plate 37, the openings 38 in the arched sections and splice plate through which the bolts pass being elongated to permit the united parts to have free relative movements sufficient to compensate for transverse expansion thereof and of the boiler shell. The sections of each arched brace member 27, 28 and 33 are also similarly secured by bolts 35 to the upper portions of saddle braces 40 fastened to the boiler shell 3, which braces 40 are provided with upper edge portions lying flush with the horizontal webs of the arched frame members. In addition, the arched frame members may be loosely connected by brace members 41 to the boiler shell. Longitudinal braces 42 are also provided to rigidly connect the depending limbs of the arched braces 28, 31 and 33 at each side of the shell to hold them against either outward lateral or longitudinal displacement.

The arched frame members and coacting parts above described form a supporting superstructure for the cowl shell proper, which comprises arcuately curved steel sheets 43 to 52, inclusive, longitudinally covering the spaces between the frame members 25 and 27 and the adjacent frame members 28, 31, 33 and 33', and transversely covering the boiler shell between the running board sections to which said frame members are respectively attached. Each cowl sheet is formed in two sections longitudinally divided above the center line of the boiler, the adjacent edges of the sections of which meet above the center line of the boiler having an ordinary hook-joint connection 51'. The rear sheet 43 may have at its rear edge either a fixed or a suitable sliding or slip joint lap connection with the frame member 25 and the joints between the front edges of the sections of said sheet and the frame members 25 and 27 are covered by joint closing bands 52' and 53' fastened respectively by the jacket band lugs 26 and 29 to the running board sections 19 at opposite sides of the locomotive. The rear edge of the sheet 44 similarly laps over the frame member 28 and underlies a similar joint covering band 54'. From this point forward along the length of the cowl, and beginning with the front edge of the sheet 44, the cowl sheets having their adjacent edges butted together, each edge over-lapping half of the width of the arched angle irons forming the supporting framework, said edge being free from connection with each other or with the frame members and being covered by joint closing bands 55 similar to the bands 52' and 53', so that the cowl sheets may have sufficient longitudinal movement to compensate for expanding and contracting movements of the boiler shell. All the cowl sheets 30 and 44 to 52, respectively, are fastened by jacket lugs 56, of similar type to the lugs 26 and 29, to the running boards, the lugs being conveniently arranged for fastening purposes and to permit of the detachment and removal of the cowl sheets independent of one another when required. The sheets of the cowling are properly shaped to give the described external streamline formation to the boiler between the front of the cab and forward end of the smokebox, and the cowling is properly spaced from the shell to prevent it from being unduly influenced by temperature variations in the boiler while adapting it to serve as a heat retaining jacket, whereby conservation of boiler heat is effected. Each jacket band lug 26, 29, 56 may consist of a bolt extending through the running board and lugs or bracket pieces on the cowl sheets and through the foot portions of the frame members and fitted with securing nuts of suitable type. The foot portions of the arched frame members may also be fastened to the running boards independently of the lugs in any suitable manner.

The cowl sheets, as above described, are thus adapted for limited longitudinal shifting movements to compensate for longitudinal contraction and expansion of the boiler. They are also adapted by their inherent resiliency to expand and contract transversely with the boiler. The loose joint connections between the arched frame members 27, 28 and 33 and the splice plates 37 and braces 40 further provide for the secure support of these members while permitting their sections to have relative movement to compensate for transverse expansion and contraction of the boiler independent of the cowl sheets and without throwing strain thereon.

The space over the top and at the sides of the boiler shell between the braces 27 and 28, which houses the steam turret for auxiliaries and turret piping and other accessories, instead of being covered by fixed cover sheets, is closed above the filling sheets 30 by a top door 57 and side doors 58. The top door 57 is hinged at its forward edge, as at 59, to swing upwardly and forwardly to open position, and the rear edge of said door is provided with slots 60' to receive and slidably engage fastening bolts 60 whereby the door may be secured in closed position. Each side door 58 comprises an upper section 58ª hinged at its upper edge, as at 61, to a fixed filler sheet 58' fastened to the frame members 27 and 28 and a lower section 58ᵇ hinged at its upper edge, as at 61', to the lower edge of the upper section 58ª, the construction being such that on lifting pressure being applied to the lower portion of the door section the door as a whole may be swung upward to open position on the hinges 61, in which action section 58ª swings over and rests in inverted position upon the filler sheet 58', while the section 58ᵇ through its hinge connection 61' swings over and rests upon the section 58ª. Spring loaded latch hooks 62 are provided at the lower edges of the door sections 58ᵇ to engage keepers 62' on the filling sheets 30 to hold said doors in closed position. These doors when in closed position lie flush with the cowl sheets and maintain the streamline formation of the cowl and they allow ready access to be obtained to the turret auxiliaries and accessories while protecting the same from the elements and from liability of freezing in cold weather. Plates 65 and 66 extend between the arcuate frame members over the central portion of the boiler and have flanges 65' and 66' at their ends which respectively bear against one of the sides of a frame member and against the splice plate 37 at opposite sides of the saddle 40 and are respectively secured to the frame members and saddle and the frame member and splice plate by the sets of bolts 35 and 36. The frame members 27 and 28 are connected and reinforced by two-part braces each comprising a tie rod or bar member 63 rigidly connected to one of the frame members, as the member 28, and adjustably and slidably connected to a bracket member 64 on the other frame member, as the member 27, by shoulder bolts 64' having free movement in elongated slots 64ª. These connections 64', 64ª and the bolt and slot connections 60, 60' between the door 57 and frame member 27 permit the parts of the turret portion of the cowl to have free relative motions relative to each other and to the boiler to compensate for expansion and contraction of the boiler. These plates 65 and 66 reinforce the frame members, saddles and tie plates and underlie and reinforce the cowl sheets sufficiently at the top to allow such portion of the cowl to be used as a runway along which the engineer, fireman or a repairman may walk for the purpose of inspecting, repairing or servicing the cowl portions, turret appliances and other parts accessible through the top of the cowl, as hereinafter described.

The hood portion 22 of the streamline covering comprises a framing formed of vertical and transverse frame members 67 and 68 suitably united to each other, to the boiler front and pilot beam, and to the frame members 31, and steel cover sheets secured thereto. These cover sheets consist of a main sheet or sheets 69 extending transversely across the front and around the sides of the boiler sheet between the frame members 31 and vertically between the pilot beam and level of the top of the boiler front, a top or frontal sheet 70 covering the space between the upper edges of the sheets 69 and the front cowl sheets 52, and a depending bottom sheet 71 covering the pilot and a coupler of drop type (not shown), the edges of said sheets 69 and 70 lapping over the front cowl frame members 31 and top and bottom transverse front frame members 68 and being covered by cover straps 72 and the lower edge of the sheet 71 being stiffened by a reinforcing or stiffening bar or bead 73. In designing the streamline structure for the front of the locomotive consideration has been given to making the contours of the hood similar to those of a parabola or conic sections thereof. Generally speaking, the hood portion inclines on a straight line upwardly and rearwardly from the tip of the pilot to the frontal sheet, which curves upwardly and rearwardly and merges into the front of the cowl, and the sides of the hood sheets are curved from its vertical center outwardly and rearwardly and merge uniformly into the sides of the cowl sheets. More specifically stated a transverse section taken on the horizontal plane through the hood portion at the center line of locomotive boiler is the contour of the nose portion of a parabola; likewise, a section taken on the vertical center line except for that portion below the center of the locomotive boiler. This is a straight line contour to the tip of the pilot purposely provided to obtain the diagonal between the tip of the pilot and the forward top edge of the smoke box. An end view of the hooded portion follows the contour of the end view of a parabola, particularly from the top of the pilot beam to the top of the smoke box. Thus it will be understood that the body portion 69 of the hood being vertically between the pilot and top of the cowl and transversely between the sides of the cowl of substantially parabolic contour, so as to impart a streamline head formation to cause the air to travel over a smooth surface upwardly and rearwardly over the top and toward the sides of the cowl, whereby both head and angle resistances to travel are greatly reduced. The bottom sheet 71 is so arranged as to expose the steps 74 at the sides of the pilot and terminates at its sides inwardly of the ends of the pilot beam 5, leaving such ends of the beam projecting to form steps 75 between the steps 74 and ladders or stairways 76 leading therefrom at each side of the front of the locomotive to the front running board sections 18. The transverse contour of the hood, including that of the pilot plate portion 71, follows also as closely as possible that of a parabola, in order to guide currents of air laterally toward the skirtings, as hereinafter described.

The auxiliary steam exhaust stack and smoke stack are enclosed within the cowl space by a streamline casing or framing shell 77 of substantially ovoidal form and comprising vertical walls 78 and top horizontal closure walls 79, the former tapering forwardly and rearwardly from the transverse center line of the smoke stack. The said stacks and their enclosing casing are arranged in a wind channel or chute 80 extending longitudinally through the frontal sheet of the head to a point in rear of the smoke stack and made of a width to permit an air current to flow freely along and rearwardly beyond the sides of the shell 77. This channel or chute is formed by cutting away portions of the frontal sheet 70 and cowl sheets 51 and 52 and providing at the sides and rear end of the cutaway portions vertical walls 81 and a rear transverse wall 82 extending from cowl sheet 51 downwardly and forwardly to the top of the boiler shell, forming the scoop portion of the wind scoop, and by providing the frontal sheet with side and depressed bottom wall portions 83 and 84 forming the entrance to the chute. The purpose of this chute is to provide, when the locomotive is in forward motion, a blast of air to augment and increase the efficiency of the draft through the smoke stack and to lift the cinders, smoke and gases vertically above the level of the top of the locomotive cap and cars of the train and prevent the same from clouding the front windows of the cab and interfering with the free vision of the engineer and also from passing back and sifting into cars of the train, thereby overcoming a well known smoke nuisance. To assist in raising the smoke and gases the rear wall 82 of the chute is curved or sloped upwardly and rearwardly to form a deflector or scoop plate, and in order to ventilate the air space over the smokebox and front end of the boiler and between the same and the cowling the side walls 81 of the chute are formed with louvres 81', whereby the hot air from such space is drawn out by suction and cooler air allowed to take its place to keep the temperature at this point to a moderate degree. A grid 85, curved to conform to the curvature of the frontal plate, extends across the entrance to the chute between the walls 83 and reinforces these walls while maintaining the streamline contour at this point. By the above described construction of this central wind chute any eddying of air currents in back of the smoke stack, producing a drag that would cause the exhaust gases to trail back over the locomotive and train, is prevented and a free upshoot of the air currents obtained to eliminate the smoke nuisances described.

As shown in Fig. 22a, the construction of the wind channel or chute may be modified by closing it at top by a cover plate 80$^a$ between its inlet end and a point about in line with the transverse center of the smoke stack, thus preventing any escape of air from the chute in advance of the stack so that the air will be discharged at the rear of the chute and against the scoop 82 in the form of a blast, thus increasing its smoke lifting effect. Preferably the rear edge of the plate 80$^a$ terminates at a point approximately at the transverse center of the smoke stack, its said rear edge being cut on a taper outwardly and forwardly to discharge a certain amount of air at the sides of the stack to lift the smoke with angling winds blowing.

The cowl shell over the top of the boiler is provided with a well or depressed chamber 86 enclosing the bell, a well 87 enclosing the whistle, boiler safety valves and boiler syphon pipe and valve, and a well 88 enclosing the safety filling valves and pipes. These consist of sleeves made of jacket iron extending from the outer shell surface to the boiler shell. The sleeves are of suitable form for the respective purposes, and louvers 89 are provided in the sides of the whistle well for venting the low water alarm which is ordinarily subjected to atmospheric pressure. In line with such appurtenances as sand traps, blower and air pump valves, throttle bell crank and throttle compensating lever access openings are provided normally closed by sliding doors 90 preserving the streamline contour while allowing ready access to such parts, while in line with the washout plugs and blower elbows access openings are provided, each formed by a thimble 91 closed by a cap 91' having a tubular part 92 to fit snugly within the thimble, each cap being secured to the coacting thimble by a light loss-preventing chain 93. The boiler checks 94 on the center line of the first course of the boiler are covered by a streamline casing 95 flanged for riveting to the boiler shell, a rectangular slot or access opening 96 being provided for the introduction of a wrench for opening and closing the valves. This construction around the stack and the elimination of projections, such as sand dome, bell, steam dome, whistle, safety valve, generator, etc., above the surface of the shell causes the wind to blow over and off the smooth surface without disturbance or drag.

The hood 22 over the front end of the boiler is spaced by its framing therefrom to provide a casing for the air compressors, turbo-generator, a drop coupler, etc., including piping and protects these various appurtenances and the course sheets from head winds, rain and snow and attendant fluctuating temperatures and maintains a steady and even smokebox temperature. In this hood is provided an inspection opening closed by a panel door or cover plate 97, which allows access to such parts except the turbo-generator and coupler; other openings, respectively closed by a panel door, cover or name plate 98 and by a panel door 99, being provided to permit access to the latter-named parts and to permit use of the drop coupler. The doors or plates 97 and 98 may be secured in place by bolts or other suitable fastenings. The door 99 may be hinged to swing upwardly by means of spring strap hinges at its top and be locked in closed position at its bottom by a fastening bolt and nut or other means. In the door 97 is an opening through which the front of the headlight 100 projects, which opening is surrounded by a collar 101 giving a streamline conformation about the light and so made as to adapt the door to be opened and closed without interference from the collar and without removing the same.

The side panels or skirts 23 at the sides of the locomotive, which extend from the front of the cab to the pilot beam, are designed as far as possible to enclose and protect the power portion of the locomotive and portions of its running gear against side and angle wind resistances, and, without obscuring the vision of the engineer and fireman through the front cab windows, to maintain with the sides of the tender a streamline side formation from the head end of the locomotive to the tail end of the tender. Each of these side panels or skirts consists of a front panel sheet 102 arranged in advance of the front running board section and extending upwardly from the level of the step 75 of the pilot beam to the level of the intermediate running board section, a pair of filler sheets 103, 103', and a series of panel doors 104 to 111, inclusive, depending on the outside of the running gear from the running board sections and floor of the cab. The panel doors 104 to 111, inclusive, are hinged at their upper edges to the running board sections or cab floor, as the case may be, the doors 104, 105 and 106 being hinged to the running board section 18, the doors 107, 108 and 109 to the running board section 20, the door 110 to the running board section 19, and the door 111 to the cab floor, so that said doors may be swung outwardly and upwardly to raised positions, thus allowing free access to the parts of the running gear and parts beneath the boiler and cab for inspection, lubrication, repairs and other purposes. The panel sheet 103 is arranged immediately in rear of the stairway or ladder structure leading at the adjacent side of the front of the locomotive and extends upwardly from the pilot beam to the front running board section 18, and extends upwardly from the outer edge of the running board section 19 to the level of the top of the outer rail of the stairway and to the level of the running board section 20, while the sheet 103' extends upwardly above the panel 110 from the outer edge of the rear running board section 19 to the level of the upper edge of the running board section 20 so as to make the skirts continuously smooth surfaced from the horizontal level of the board 20 downward and to prevent the gaps which would otherwise be presented owing to the different levels of the floor sections and upper edges of the panel doors hinged thereto. By this construction also the sheet 103 forms with the upper portion of the outer rail of the stairway an upstanding guard or rail at the outer side of the running board section 18, while the sheet 103' forms a similar upstanding guard or rail at the outer side of the running board section 19, to give greater security and safety to the engineer or trainman in traveling over the running boards. The panel doors abut when in closed position against a permanent frame comprising T-shaped vertical frame members 113, depending from and fastened to the running board sections and cab floor and braced from the cab frame and boiler shell or other fixed parts of the locomotive structure, and a brace or frame member 114 secured to the engine frame. The panel doors 104 to 109, inclusive, are connected by depending hinges 112 with the running board sections, so as to swing outwardly and upwardly through an arc which may be less than 90°, and each of said panel doors is connected by folding toggle link braces 115 to the frame member or members 113 and 114 against which it closes, which braces act to hold the door when opened, as shown in dotted lines in Fig. 10, in such position. Each door 104 to 110, inclusive, is adapted to be fastened at its lower edge to the associated angle metal frame member 114 by fastening screws 114'. The door 111, however, is hinged at its upper edge to the cab floor 4ª by hinges 112' extending above the plane of the floor and arranged to allow said door to be swung upwardly and outwardly in an arc of 90° so as to fully expose and permit easy access to the ash pans for cleanout, inspection, repairs and other operations. The door 111 is adapted to be fastened at its lower edge to the associated angle frame member 114 by latch bolts each comprising (see Figs. 12, 13 and 14) a threaded stem 116 fitted to swing vertically in an angle slot 117 in the frame member 114 and adapted to engage a keeper 118 counterbored or countersunk in the lower edge of the panel door 111. Disposed in a channel formed between the vertical wall of the member 114 and an upright flange 119 carried thereby is a clamping bar 120 having a threaded opening to receive the stem 116 and disposed between said bar and wall is a spring lock washer 121. The outer end of the stem carries an operating handle 122. Figs. 12 and 14 show the parts in locked position, from which it is seen that the bolt is swung upwardly in slot 117 and into engagement with the door slot and is screwed up to jamb the bar 120 and washer 121 against the frame member 114 and the handle against the panel door, thereby locking the lower edge of the door to the frame member. In this operation a conical surface 118' on the handle 122 enters the countersink 118, whereby when the handle is tightened up the lower edge of the door is firmly locked to the frame. To release the bolt, the handle is turned to rotate the bolt stem so as to loosen the clamping bar, whereupon the handle and stem may be swung downwardly to the release position shown in Fig. 13. These latch bolts serve to hold the doors 110 and 111 rigidly in closed position while permitting of their quick release for opening movement when required. Each panel door 104 to 109, inclusive, however, is also preferably adapted to be secured at each side at or about centrally of its height to a frame member 113 and to an adjacent door panel, as shown in Fig. 11, by a pivoted gravity latch dog 123 pivotally mounted at one end on a bracket 124 on the inner side of the side edge of a door panel and adapted to bear against the inwardly extending portion of a T-shaped frame member 113 and to engage a notch or recess 125 in the upper edge of a keeper plate 126 fastened to the adjacent side edge of an adjoining panel. This keeper plate has a beveled nose 127 leading to the notch 125. Fig. 11 shows the latch in fastened position. To release it the hand of the operator or a tool is passed upwardly from below the lower edge of one of said door panels and the latch thrown upwardly or "kicked" out of engagement with the keeper and, if desired, out of engagement with the frame member 113, so that one or both doors may be released. To reengage the latch the door carrying the latch, if not closed, is closed, and the latch swung upwardly to a position in which it will engage the nose of the keeper and ride into engagement with the keeper notch when the door carrying the keeper is closed. These latches 123 are preferably provided to secure the doors 104 to 109, inclusive, at a suitable point above their lower edges to prevent them from bulging or chattering under motions of the locomotive or wind pressures. Other suitable fastening means may, however, be employed to secure the doors firmly in closed position. These side panels or skirts protect the motion parts, maintain even cylinder temperature and prevent frozen pipes. The panel or skirt formation is completed at the front of the locomotive by the sides of the plate 71 and fender-like fixed filler sheets 128 closing the spaces beneath the lower forward portions of the panels 104 and plate 71 beneath the projecting ends of the pilot beam. The front portions 128a of these sheets lying below and in front of the pilot beam slope upwardly and rearwardly between the steps 74 and 75 and also slope laterally and rearwardly toward the side portions 128b of said sheets which lie in the plane of the skirtings, said sheet portions 128b thus arching out over the front wheels of the front truck and merging into the adjacent lower front portions of the panels 104, which may be similarly sloped and arched or bulge outward over the cylinders, so that the head and angle air currents striking the rearwardly curved sides of the hood sheet 71 will be deflected rearwardly and toward the outer sides of the panels or skirtings instead of upwardly or directly against the elements of the running gear, whereby head and angle wind resistances will be materially reduced.

It will be observed that the side panels or skirts are concavely curved at their lower edges, as at 25', between the front ends of the front and rear wheel trucks, thus forming recesses which allow ordinary service inspection and lubrication of the motion parts of the running gear without opening the panel doors.

The stairways 76 at each side of the front of the locomotive between the step ends 75 of the pilot beam to the forward ends of the running boards 18 are formed by the panel sheets 102 previously described, which serve as outer side rails, inner side rail sheets or plates 129, and steps 130 and 130' extending between and supported by said sheets 102 and 129, the upper steps 130' of the stairways, which are flush with the running boards 18, being of openwork construction or in the form of ventilator grids or gratings. The parts 102, 129, 130 and 130' are rigidly connected to form a unitary swinging stairway or ladder structure which has its step member 130' connected by hinges 130a with the front edge of the running board section 18 so as to be swung upwardly from its normal position, in which it covers the front of the space between the panel skirt and side of the boiler and covers the front wheels of the running gear, to an upwardly inclined position in which it gives access to the locomotive valve cylinders and air pumps and other adjacent portions of the power plant and running gear. The stairway when in normal or closed position rests at its base upon the pilot beam and is detachably secured thereto by bolts or other suitable disconnectible fastening means 130b. Each stairway is closed at its rear by a wall 131 spaced from the steps and extending from the step 75 to the rear of the grating 105 at an upward and rearward angle and forming a correspondingly inclined air chute 132. When the stairway is in normal position the rear edge of the upper portion of the rail 102 abuts against the front edge of the sheet 103 and a bracket plate 102', bolted to said parts, is provided to hold them in fixed position. The forward portion of sheet 103, however, is not rigidly fastened to the running board section, but is left free or sufficiently flexible to adapt it to be pressed outward laterally, when bracket plate 102' is released, in order that the upper part of rail 102 may move inside and clear the sheet 103 when the stairway is swung upwardly.

A hand rail 133 extends along each side of the hood and cowl from the step 75 to a point in line with the rear end of the running board section 20 at a suitable elevation above the stairway and running boards 18 and 20 for the convenience of the locomotive crew in traveling along the sides of the locomotive, and the doors 58 are provided with handles 134 which serve the dual function as hand rails above the running board sections 19 and as handles for manipulating said doors. In addition to these hand rails 134 the doors 58 may be provided at their lower edges with handles 134' for manipulating them. When the locomotive is in forward motion the air currents following the sloping sides of the hood above the pilot beam level, and not deflected outwardly beyond the vertical plane of the side panels, strike the chute walls 121 and are deflected upwardly through the chutes and ventilator gratings 130' and travel upwardly and rearwardly above the sides and top of the cowling and over the top of the locomotive and reduce the resistance to travel of the locomotive. These upwardly and rearwardly traveling air currents cooperate with and augment the action of the air currents produced by the chute 80 to elevate and carry the products of combustion discharging from the stack rearwardly and over the top of the locomotive, tender and cars of the train, thus preventing the smoke and gases from obscuring vision through the cab windows or settling down upon the cars of the train. The front edges of the rear running boards 19 are spaced vertically from the rear edges of the intermediate running boards 20 to produce air release passages 135 and at the juncture of each running board 19 with the adjacent side of the front cab wall, which is straight and vertical and disposed at an angle of 90° to the horizontal plane of the top of the cowling, is provided a curved deflector or scoop plate 136. This scoop plate 136 is adjustable to regulate its angle of inclination and is provided with louvres or openings 137 arranged above openings 138 in the running board 19 to permit downflow of air in advance of the clear vision cab windows 15' and also to permit any cinders, snow or other solid foreign particles or water ordinarily deposited at this point to discharge and prevent the same from being carried upward and striking the said windows. These downdraft currents of air create suction zones in advance of the cab windows whereby particles heavier than the air, such as cinders, dust, insects and like solid materials, are drawn downward and discharged through the vents 135, 137 and 138 and prevented from striking or entering the cab windows, thus maintaining clear vision zones in front of the windows.

The rear edges of the front running boards 18 are similarly spaced vertically from the front edges of the intermediate running boards 20 to produce air release passages 135' which are covered by curved deflector plates 136' having louvres or openings 137' therein to regulate the flow of air currents at this point, as hereinafter described. If desired, and, as shown in Fig. 2a, the curved deflector plates or scoops 136 may be dispensed with, or in lieu thereof flat forwardly inclined imperforate deflector plates 136ª, as shown in Fig. 2b, may be used.

Figs. 1c, 1d, 2a, 2b and 6b show by the full line indicating arrows the general directions of flow of the air streams striking the locomotive and by the dot and dash line arrows the resultants of such flows. In the forward travel of the locomotive the air striking the upwardly and rearwardly inclined hood 22 is divided into several streams. One of these streams flows upwardly and rearwardly above the cowling and forms a layer of air of infinite depth between the top of the cowling and a level at a considerable elevation thereabove. Other streams striking the hood 22 flow through the grating 85 into and along the wind channel 80 and along the streamline surfaces of the exhaust steam stack and smoke stack and strike the scoop plate 82, these streams or currents being merged and shoot upwardly and rearwardly and mingling with the current of air flowing directly upward and rearward from the hood 22. The air shot upward from the channel 80 carries with it the discharging smoke and gases from the smoke stack to a level above the top of the cab, the smoke and gases thus being caused to travel upwardly above the level of the locomotive and train and being dissipated in their flow. Other portions of air striking the hood 22, particularly at the sides thereof between the horizontal levels of the steps 75 and front running boards, enter the channels or chutes 132 and are discharged through the grids or gratings 105. These streams of air are projected upwardly and rearwardly and augment the action of the streams of air projected upward from the channel 80 by the scoop 82 to ensure the raising of all particles of the smoke and gases to the high level stated and to increase and promote the efficiency of the stack draft. By thus projecting the streams of air from the stack channel 80 and the side channels 132 any portions of the smoke and gases dispersed laterally from the stack are prevented from falling and are caused to ascend to the predetermined high dissipation level established. Portions of the air striking the plate 71 are diverted laterally and rearwardly by the fenders 128, while other portions of the air striking the sides of the hood, above the level of the running board sections 18, travel rearwardly along the sides of the cowling and are thence deflected outwardly at the front of the cab and rearwardly along the sides of the cowling to the cab, along the curtains between the cab and tender, and along the sides of the tender to the rear thereof. Those portions of the air which are not deflected upwardly and into the channel 80 or channels 132 at the sides of the locomotive flow rearwardly over the side panels, sides of the cab, the curtains between the cab and tender and along the sides of the tender, which forms smooth and continuous surfaces, so that the air resistance to travel of the locomotive and tender is reduced to a material degree as compared with locomotives of ordinary construction. In the travel of air along the sides of the cowling above the running board sections 18 a proportion of this air discharges downward through the louvers or openings 137' in the scoop 136' and through the underlying relief opening 135', which air in its travel will carry off any cinders or other foreign particles of solid matter which may have been deposited on the boards 18 and also serve to cool the air brake radiating pipes beneath the board 20. The air streams traveling along the top of the cowling above the plane of the running boards strike the upper portion of the front wall of the cab and are deflected straight upwardly, while those streams of air traveling above the running board sections 20 and 19 are divided into streams, one stream discharging beneath the running boards through the relief opening 135 and another stream on striking the deflector 136 being thrown forward and drawn downward and discharging through the louver openings in said deflector and the underlying openings 135 in the running board 19. By the provision of the openings 135 and 138 downdraft currents of the air are produced at the sides of the front of the locomotive cab in advance of the clear ventilation window 15', whereby any particles of dust or cinders which may have been deposited on the adjacent portions of the running boards, and any particles of snow or rain striking the sides of the cowl and rear running boards in advance of the clear vision window, will be discharged by the downdrafts and prevented from striking the window or entering the window if open and striking the eyes or other parts of the persons of the enginemen. The resultant effects of the air streams flowing along the sides of the cowling under the influence of the upwardly projected streams of air from the scoops and downdrafts of air through the relief openings in the running boards is shown particularly by the dot and dash arrows in Fig. 1c, from which it will be seen that the air traveling along the sides of the cowling does not flow in straight line streams but in wavy or undulating lines so as to be utilized to reduce skin friction as well as to perform the beneficial auxiliary functions described. The use of the curved scoops 136 has been found of advantage in deflecting snow, rain and foreign matter from the clear vision windows when open, but these deflectors may in some cases be entirely omitted, as shown in Fig. 2a, or in lieu thereof the forwardly inclined deflector plates 136a, shown in Fig. 2b, may be employed. The general effect of providing the cowling and hood to enclose irregular and projecting surfaces on the locomotive, and to furnish smooth surfaces in alinement at the top and sides of the locomotive, is to reduce head and angle wind resistance and parasitic resistance to such a degree as to increase locomotive speed, reduce the amount of fuel required for driving the locomotive at any certain speed, and to eliminate the usual smoke nuisances and annoyances and hazards caused thereby. Actual wind tunnel tests with a scale model have shown in the use of a locomotive equipped with our invention that air resistance to travel, owing to this streamline construction, is reduced to as much as 35.7% in case of direct head winds and to as much as 22.5% in the case of 15° angle winds for the longitudinal component, while causing the smoke from the stack to flow clear of the locomotive and tender without any eddy current or downdraft effects.

It will be understood that the steam dome, sand box filling hole and other wells or openings in the streamline covers of the locomotive and tender may be provided with suitable removable covers, and that suitably closed train and signal line outlets, in addition to those shown, may be provided in the front hood for doubleheading purposes. Also that suitably closed openings may be provided in the running boards or other parts for access to various appurtenances so that such appurtenances will be shielded from exposure to the elements while rendered conveniently accessible. If desired, a transverse handrail may be provided on the front hood for convenience of trainmen in climbing to the running board steps and gaining access to the headlight and other parts at the front of the locomotive.

From the foregoing description, taken in connection with the drawings, the mode of operation of our novel and improved streamline construction of locomotive will be readily understood without a further and extended description and its advantages in eliminating smoke nuisances, keeping the cab windows clear for clear vision, maintaining even cylinder and other working temperatures, and protecting the service appliances and air and steam conducting parts of the locomotive from injury or freezing, will be readily understood and appreciated by those versed in the art. It is to be understood that the features of the invention may be employed not only in partly or wholly streamlining steam locomotives, but may be embodied in electric locomotives or locomotives driven by gasoline and Diesel engines. It will also be understood that while the structure herein disclosed is preferred, changes in the form, proportions and details of construction of the parts may be made, within the scope of the appended claims, without departing from the spirit of the invention or sacrificing any of the advantages thereof.

What we claim is:

1. A locomotive having a boiler, a cab, a smokestack, a cowling extending over the top of the boiler and boiler smokebox substantially level with the roof of the cab and having depending portions extending downwardly at the sides of the boiler, said cowling being provided with an air scoop about the smokestack, and a hood covering the front of the boiler smokebox, said scoop extending through the top portion of the hood, said hood being arcuately curved transversely and extending at an upward and rearward angle on a substantially straight line from its lower edge to its upper edge and merging at its upper edge into the top of the cowling and at its side edges into the sides of the cowling, the side walls of said scoop being provided with openings connecting the scoop with the spaces between the sides of the boiler and sides of the cowling.

2. A locomotive having a boiler, a cab, a smokestack, running boards extending along the sides of the boiler, a cowling extending over the top of the boiler and boiler smokestack between the cab and front of the smokebox substantially in the horizontal plane of the roof of the cab and having side portions extending downwardly over the sides of the boiler to the level of the running boards, a hood covering the front of the boiler smokebox between the tip of its pilot portion and the top of the smokebox and merging at its top and sides into the top and sides of the cowling, said cowling being provided with an air scoop extending about the smokestack and opening through the front of the hood, channels at the sides of the locomotive forming auxiliary air scoops inclined at an upward and rearward angle from points adjacent the sides of the hood to the level of the running boards, and steps at the sides of the locomotive leading upwardly to the running board within the channels of the said auxiliary air scoops.

3. A locomotive having a boiler, a cab, running boards extending along the sides of the boiler, a cowling covering the top of the boiler and smokebox and sides of the boiler down to the level of the running boards, said cowling having its greatest width and diameter at the forward end of the firebox and tapering therefrom forwardly to the front of the smokebox and rearwardly to the cab, and a hood portion covering the front of the boiler smokebox and merging at its top into the forward end of the cowling and at its sides into the depending sides of the cowling.

4. A locomotive having a boiler, a cab, a smoke stack adjacent the front end of the boiler, a hood covering the end of the boiler smokebox, and a cowling covering the top and sides of the boiler and boiler smokebox, said cowling having an air channel extending on opposite sides of and rearwardly beyond the stack and opening at its forward end through the upper portion of the hood, the side walls of said channel being provided with air inlets connecting the sides of the channel with the spaces between the sides of the boiler and sides of the cowling.

5. A locomotive having a boiler, a cab, a smoke stack adjacent the front end of the boiler, a hood covering the front end of the boiler smokebox, a cowling covering the top and sides of the boiler and smokebox, said cowling having an air channel extending on opposite sides of and rearwardly beyond the stack and opening at its forward end through the upper portion of the hood, the side walls of said channel being provided with air inlets connecting the sides of the channel with the spaces between the sides of the boiler and sides of the cowling, and a screen extending across said opening.

6. A locomotive having a boiler, a smoke stack adjacent the forward end thereof, a cowling spaced from the boiler and extending over the top of the boiler and smokebox and having a smoke lifting air conducting channel about the stack, said channel having at its rear an inclined scoop for deflecting the air upwardly and adjacent thereto openings connecting the sides of said channel adjacent the scoop with the space between the cowling and the boiler.

7. A locomotive having a boiler, a cab, a smoke stack adjacent the forward end of the boiler, a cowling over the top portion of the boiler and boiler smokebox and having side portions depending along the sides of the boiler and smokebox, a hood covering the front end of the boiler smokebox and arching across the front thereof and merging at its sides into the depending sides of the cowling, said hood extending upwardly and rearwardly from the tip of the locomotive pilot on a substantially straight upwardly and rearwardly inclined line to the top of the smokebox and having a rearwardly curved portion intercepting the top of the cowling, said cowling being provided with a smoke lifting air channel about the smoke stack and opening at its forward end through the curved upper portion of the hood, the side walls of said channel being provided with air inlets connecting the sides of the channel with the spaces between the sides of the boiler and sides of the cowling.

8. A locomotive having a boiler, a cab, a smoke stack adjacent the front of the boiler, running boards at the sides of the locomotive, a streamline cowling over the top of the boiler and boiler smokebox and extending downwardly over the sides of the boiler to the level of the running boards, a hood covering the front end of the boiler smokebox and the pilot portion of the locomotive and having rearwardly curved sides merging into the depending sides of the cowling and an upwardly and rearwardly curved top merging into the front of the cowling, said hood being inclined on a substantially straight line from the tip of the pilot to said curved top portion thereof, skirting at the sides of the locomotive below the level of the running boards, and steps disposed adjacent to the sides of the hood and between the depending portions of the cowling and the skirtings, said steps leading to said running boards.

9. A locomotive having a boiler, a cab, a smoke stack adjacent the front of the boiler, a streamline cowling over the top and sides of the boiler and boiler smokebox, a hood covering the front end of the smokebox and the pilot portion of the locomotive and having rearwardly curved sides merging into the sides of the cowling and an upwardly and rearwardly curved top merging into the front of the cowling, said hood being inclined on a substantially straight line from the tip of the pilot to said curved top portion thereof, the front portion of the cowling being provided with a smoke lifting air channel about the smoke stack and opening at its forward end through the curved top of the hood, the side walls of said channel being provided with air inlets connecting the sides of the channel with the spaces between the sides of the boiler and sides of the cowling.

10. A locomotive having a cab, a boiler, a smoke stack adjacent the forward end of the boiler, a streamline cowling extending over the top of the boiler and boiler smokebox and having its forward portion provided with a main air scoop disposed about the smoke stack for projecting upwardly an air stream to raise the smoke and gases issuing from the stack, and upwardly and rearwardly inclined auxiliary air scoops arranged at the sides of the locomotive below the level of the main scoop and effective on the forward travel of the locomotive to form and direct auxiliary air streams upwardly and rearwardly in the region of the main air scoop to augment the smoke lifting action of the stream of air from the main air scoop on the smoke issuing from the stack and to cooperate therewith to lift the smoke from the stack to a level above the cab level.

11. A locomotive having a boiler, a cab, a smoke stack adjacent the front of the boiler, a streamline cover for the top of the boiler and boiler smokebox provided with an air lifting scoop disposed about the stack for projecting upwardly a stream of air to raise the smoke and gases issuing from the stack, and channels arranged on opposite sides of the forward portion of the locomotive below the level of the stack scoop and extending longitudinally at an upward and rearward angle from points adjacent to the front of the locomotive to points in rear of a transverse line passing through the rear end of the stack scoop and providing auxiliary air scoops effective on the forward travel of the locomotive for forming and projecting upwardly streams of air in the region of the stack scoop to augment the smoke lifting stream of air projected upwardly by said stack scoop and to cooperate therewith to lift the smoke from the stack to a level above the cab level.

12. A locomotive having a boiler, a cab, a smoke stack adjacent the front of the boiler, running boards extending along the sides of the boiler, a streamline covering for the top of the boiler and boiler smokebox, said covering being provided with an air scoop disposed about the stack for projecting upwardly a stream of air to raise the smoke and gases issuing from the stack to a level above the level of the cab, and upwardly and rearwardly inclined channels at the sides of the locomotive located in advance of the forward ends of the running boards and providing auxiliary air scoops effective on the forward travel of the locomotive for collecting and projecting auxiliary streams of air upwardly and rearwardly in the region of the stack scoop to augment the smoke lifting stream of air from the stack scoop and to cooperate therewith to lift the smoke from the stack above the cab level.

13. A locomotive having a boiler, a running gear, a cab, running boards at the sides of the locomotive between the forward portion of the boiler and the cab, a cowling arching transversely over and covering the top and sides of the boiler and boiler smokebox between the running boards, skirtings at the sides of the boiler extending from the running boards downward outside the running gear, and guards projecting upwardly at the outer sides of the running boards and forming upward extensions from said skirtings.

14. A locomotive having a boiler, a running gear, a cab, running boards at the sides of the locomotive between the forward portion of the boiler and the cab, a cowling over the top of the boiler and top of the boiler smokebox extending transversely between the running boards, skirtings at the sides of the locomotive extending from the running boards downward outside the running gear, the forward portion of the top of the cowling being provided with an air scoop channel for projecting streams of air upwardly to lift the smoke and gases from the smoke stack above the level of the cab, steps at each side of the locomotive leading to the front ends of the running boards, and air scoops in rear of and in open communication with the spaces between the steps for projecting streams of air upwardly to augment the lifting streams of air produced by the air scoop channel.

15. A locomotive having a boiler, a cab provided with front windows, a smoke stack arranged adjacent to the forward end of the boiler, a streamline cowling about the stack having an air scoop for raising the smoke and gases issuing from the stack above the level of the cab, running boards extending along the sides of the boiler, and means arranged adjacent to the rear ends of the running boards and to the cab windows for discharging particles downward and away from said windows and downwardly through the running boards.

16. A locomotive having a boiler, a cab provided with front windows, a smoke stack adjacent the forward end of the boiler, a streamline cowling over the boiler having an air scoop for raising smoke and gases from the stack to a level above the cab, running boards at the sides of the boiler having openings therein adjacent to the cab windows, and deflectors arranged over said openings for discharging particles downwardly therefrom and away from said windows.

17. A locomotive having a boiler, a cab provided with front windows, a smoke stack adjacent the forward end of the boiler, a cowling over the boiler having an air scoop for raising smoke and gases issuing from the stack above the level of the cab, running boards at the sides of the boiler having front, rear and intermediate sections, the rear sections having vent openings therein below the cab windows and the intermediate section being arranged above the level of the front and rear sections and spaced therefrom to provide relief openings, and perforate scoop plates covering the openings between the front and intermediate running board sections.

18. A locomotive having a boiler, a cab provided with front windows, a smoke stack, a streamline cowling over the boiler provided with an air scoop for lifting issuing smoke and gases from the stack to a level above the cab, and running boards arranged at the sides of the boiler, said running boards having downdraft openings at spaced points adjacent to and in advance of the vertical plane of the cab windows for discharging particles downwardly and away from the windows.

19. A locomotive having a boiler, a cab, frame members comprising arcuately curved sections extending transversely over and secured to the boiler and yieldingly coupled together so as to compensate for transverse expansion and contraction of the boiler, and a streamline cowling supported by said frame members in spaced relation to the boiler for free movements to compensate for longitudinal expansion and contraction of the boiler.

20. A locomotive having a boiler, a cab, a streamlined cowling enclosing the top and sides of the boiler and having top and side openings therein adjacent to the cab and about the turret portion of the boiler, frame members supporting the cowling from the boiler and including bracing elements yieldingly connecting the frame members on opposite sides of the turret openings, and doors forming portions of said cowling and arranged to close said openings.

21. A locomotive having a streamlined covering over the top and sides of its boiler formed to provide an air scoop for raising the smoke from the stack above the level of the locomotive cab, said covering having downward extensions at the sides of the locomotive provided with air scoops at the front thereof for producing and projecting smoke lifting currents of air upward to intercept and augment the action of the air current produced by the first-named scoop, and a streamlined hood covering the front of the boiler and having an upwardly and rearwardly inclined surface for directing air toward the first-named scoop and rearwardly and outwardly curved or inclined surfaces for directing air toward the second-named scoops.

22. A locomotive having a streamline cowl over the top of its boiler and boiler smokebox, said cowl comprising a framing and sheet sections arranged side by side and each secured to the framing so as to be removable independently of the others.

23. A locomotive having running boards and running board steps structurally formed to provide smoke lifting wind scoops at the sides of the locomotive.

24. A locomotive having running board ladders structurally formed to provide smoke lifting wind scoops at opposite sides of the locomotive, and means mounting said ladders so as to be movable from normal position to expose portions of the locomotive structure normally covered thereby.

25. A locomotive having a boiler, a cab, a smokestack, running boards extending along the sides of the boiler, a cowling extending over the top of the boiler, and downwardly over the sides thereof, to the running boards, said cowling having a depressed air scoop about the stack for projecting upwardly an air stream to raise the smoke and gases issuing from the stack, and air channels at the sides of the locomotive leading upwardly and rearwardly at an angle from points adjacent the front of the locomotive and providing auxiliary air scoop arranged to form and direct air streams upwardly in the region of the stack scoop to commingle with and augment the lifting action of the air stream from the stack scoop on the smoke and gases issuing from the stack.

CARL F. KANTOLA.
WILLIAM L. LENTZ.